Jan 6, 1931.     T. J. WALSH     1,787,884
LOAD INDICATOR FOR SPRING VEHICLES
Filed July 12, 1928
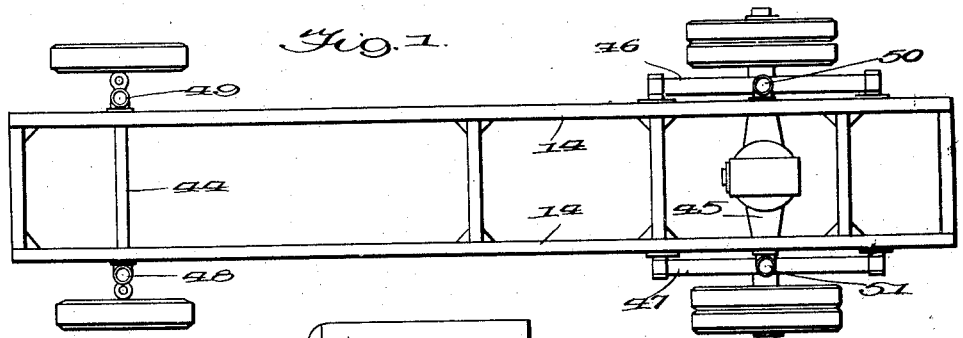
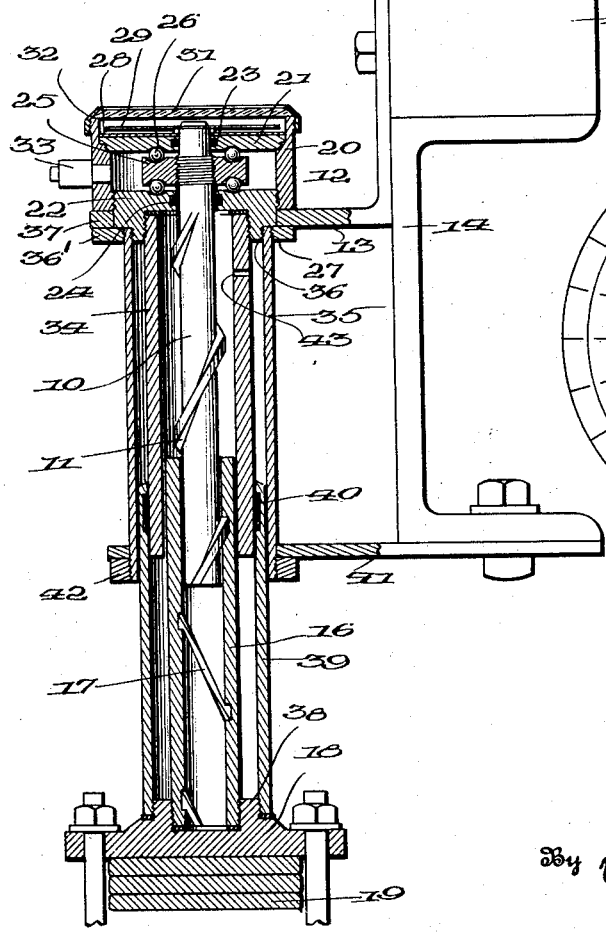
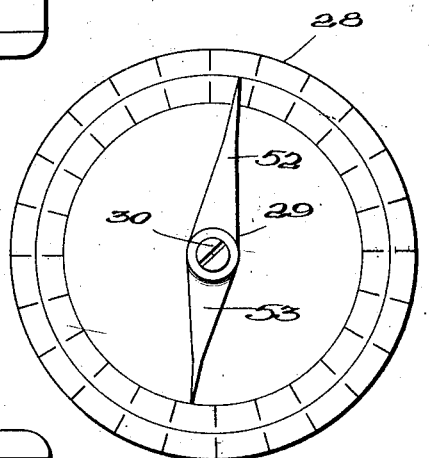
Inventor
Thomas J. Walsh,
By Cushman, Byrout Warby
Attorney Patented Jan. 6, 1931

1,787,884

UNITED STATES PATENT OFFICE

THOMAS J. WALSH, OF MOUNT VERNON, NEW YORK

LOAD INDICATOR FOR SPRING VEHICLES

Application filed July 12, 1928. Serial No. 292,189.

The present invention relates to scales adapted for permanent attachment to spring vehicles for the purpose of weighing the loads supported by the vehicles.

In the embodiment of the invention which I am about to specifically describe, I provide four of the novel weighing devices, two being interposed between each axle of the vehicle and the vehicle frame. Each scale is provided with a weighing dial and the sum of the weight indications will be the total weight supported on the springs. It is obvious that a greater or lesser number of individual devices may be provided and that if desired, their movements may be integrated and indicated on a single conveniently disposed dial. The essence of the present invention lies in the combination of elements whereby rectangular movements of the vehicle body or frame toward and away from the running gear are translated into rotary movements of an indicating device.

I shall now proceed to describe a specific embodiment of the invention with reference to the accompanying drawings, wherein Figure 1 is a plan view of a motor vehicle running gear and body supporting frame with devices according to the present invention arranged thereon, Figure 2 is a vertical cross section of one of the devices, showing the adjacent portions of the vehicle, and Figure 3 is a plan view of a novel form of dial and pointer combination particularly adapted for use in connection with the device of the present invention.

Since the operative parts of the device are shown as a whole in Figure 2, reference will be had first of all to this figure. The spindle 10, having a steep spiral thread 11, is rotatably journaled in a casing 12 which is secured by means of the bracket 13 to the channel member 14 or a sill member 15 of the vehicle frame. A tubular nut 16 is provided with a groove 17 with which thread 11 mates and the lower end of element 16 is threaded or otherwise fixedly secured to a block 18 which is in turn rigidly bolted to the spring 19 of the vehicle. Casing 12 is composed of a collar 20 into the upper end of which is screwed a disc 21 and into the lower end of which is screwed a block 22. The disc and block are provided with central vertically aligned apertures having packing grooves 23 and 24 and the upper end of spindle 10 is passed through these apertures for rotative support therein. It will be noted that thread 11 is discontinued immediately below block 22 but that intermediate the latter and disc 21 the spindle is provided with threads of normal pitch with which engage the threads of circular nut 25. In assembling the spindle 10 and nut 25 their threads will preferably be jammed so as to prevent relative rotation of the two. Nut 25 is provided on its upper and lower faces with annular grooves, and disc 21 and block 22 are similarly grooved to form races for balls 26 and 27. The described elements form what may be termed a double thrust bearing, adapted to receive both upward and downward thrusts of the spindle. A dial 28 is secured to the upper face of disc 21 and a double pointer 29 is secured to the upper end of the spindle as by screw 30. The dial 28 and pointer 29 lie somewhat below the upper edge of collar 20. Across the upper edges of the latter is secured a glass closure element 31 by means of a ring 32. Preferably a grease cup 33 is threaded in collar 20 in communication with the thrust bearing chamber.

A tube 34 is engaged in a threaded seat in the lower face of block 22 coaxially with spindle 10 and a tube 35 is also threaded onto a circular shoulder 36 on the lower face of block 22 in coaxial relation with tube 34. A nut 36' is threaded on the end of tube 35 and clamps a ring-like portion 37 of bracket 13 between it and collar 20. Block 18 is provided with an annular shoulder 38 onto which is threaded a tube 39 in coaxial relation with spindle 10 and with its upper extremity extending between tubes 34 and 35 in telescoping relation therewith. Tube 39 is provided near its upper end with an inner annular packing groove 40. Attention may here be called to the fact that tubular nut 16 has a loose fit with spindle 10 and extends within tube 34 in somewhat spaced relation thereto. Likewise, the upper end of tube 39 is spaced somewhat from the walls of both tubes 34 and 35. To secure additional rigidity of the upper portion of the device, the lower end of tube 35 is received in an aperture of a bracket 41 and a nut 42 is screwed on the lower end of tube 35 in abutting relation to bracket 41.

It will be obvious that upon movements of the running gear and frame elements toward and away from each other, spindle 10 and nut 16 will undergo similar movements, and that through the medium of the threaded engagement with the latter, spindle 10 will be rotated and movement is thus imparted to pointer 29.

All of the elements of the device are in permanent operative relation relative to each other and in order to prevent a dash-pot effect during movement of the vehicle on the road, the telescoping elements have been spaced somewhat from each other, as was pointed out above. As a further preventative of such damping effect, the tubular elements may be appropriately perforated as, for example, at 43, Figure 2. The lower elements 16 and 39, however, will not be perforated, since it is desirable to keep them partially filled with lubricating oil. Also the described looseness of the elements prevents binding due to the unequal flexing of the vehicle springs.

The devices may be conveniently arranged as indicated in Figure 1, wherein 44 denotes the front axle of a motor truck, 45 the rear axle, 14 the longitudinal frame members, and 46 and 47 the rear springs, the front springs being hidden by the forward portions of members 14. The weighing devices at the forward end of the vehicle are indicated at 48 and 49, and are disposed outside of the frame members 14 with their upper ends secured to the latter and their lower ends secured to the front axle. 50 and 51 denote the weighing device at the rear end of the vehicle, and an appropriate manner of mounting them has been described with reference to Figure 2. Where the movements of the various weighing devices are not integrated as is the case in the installation illustrated, the devices are preferably disposed outside of the body frame so that their dials will be readily visible. It is apparent that with an integrating system they might be disposed inwardly of the longitudinal frame members, and in fact, in any convenient position.

Since it is desirable that the indicating dials be of no greater diameter than necessary, I have devised a novel dial and pointer particularly adapted for use in connection with the main invention. As shown in Figure 3, pointer 29 has a long arm 52 and a short arm 53. The dial 28 is provided with an inner and outer circle of graduations with which respectively cooperate the long and short arms of the pointer, and the graduations of the inner circle are numerical continuations of those of the outer circle. Thus it may be assumed that a full rotation of the needle will register four hundred pounds (400 lbs.), the numerals on the dial representing hundreds. At this point, however, the long arm will again point to zero, but the short arm will point to four on the inner circle of graduations. Consequently, after it is known that the dial has made one complete revolution, the readings are made from the short arm of the pointer and the inner circle of graduations. It is assumed in the dial combination shown that the maximum load on any one weighing device will not exceed eight hundred pounds (800 lbs.). Of course, the size of the dial and the arrangement of the circles of graduations will depend upon the load capacity of the truck to which the devices are to be applied, although primarily, of course, they must be laid out with reference to the pitch of thread 11.

It will be understood that the details of the described device may be altered in many particulars without departing from the spirit of my invention, and accordingly it is to be understood that I do not intend to limit myself except as in the following claims.

I claim:

1. The combination of a vehicle comprising running gear and frame elements, and spring means interposed between said elements, of a spindle member having a steep pitch spiral thread, a nut member cooperating with said spindle member, one of said members being fixed to one of said elements and the other of said members having a thrust bearing support on the other of said elements whereby movements of said elements toward and away from each other cause similar movements of said members with consequent rotation of the bearing supported member, and indicating mechanism actuating in dependence upon the rotative movements of said bearing supported member, said indicating mechanism including a movable portion mounted directly on said bearing supported member.

2. The combination of a vehicle comprising running gear and frame elements, and spring means interposed between said elements, of a spindle member having a steep pitch spiral thread, a nut member cooperating with said spindle member, one of said members being fixed to one of said elements and the other of said members having a thrust bearing support on the other of said elements whereby movements of said elements toward and away from each other cause similar movements of said members with consequent rotation of the bearing supported member, indicating mechanism actuating in dependence upon the rotative movements of said bearing supported member, and telescoping tubes surrounding said members and in fixed connection respectively with said elements.

3. The combination with a vehicle comprising running gear and frame elements, and spring means interposed between said elements, of a spindle member having a steep pitch spiral thread, a tubular nut member cooperating with said spindle member, a casing secured to the frame element and having top and bottom walls provided with vertically aligned apertures, one of said members extending through said apertures, a flange fixed to the last mentioned member intermediate said walls to prevent axial displacement of the member relative to said casing while permitting its relative rotation, the other of said members being fixedly connected with the running gear element whereby relative movements of said elements toward and away from each other cause similar movements of said members with consequent rotation of the rotatable member, and indicating mechanism actuated in dependence upon the rotative movements of said rotatable member.

4. The combination with a vehicle comprising running gear and frame elements, and spring means interposed between said elements, of a spindle member having a steep pitch spiral thread, a tubular nut member cooperating with said spindle member, a casing secured to the frame element and having top and bottom walls provided with vertically aligned apertures, one of said members extending through said apertures, a flange fixed to the last mentioned member intermediate said walls to prevent axial displacement of the member relative to said casing while permitting its relative rotation, the other of said members being fixedly connected with the running gear element whereby relative movements of said elements toward and away from each other cause similar movements of said members with consequent rotation of the rotatable member, and indicating mechanism actuated in dependence upon the rotative movements of said rotatable member, said indicating mechanism including a movable portion fixed to the end of the rotatable member above said casing.

5. The combination with a vehicle comprising running gear and frame elements, and spring means interposed between said elements, of a spindle member having a steep pitch spiral thread, a tubular nut member cooperating with said spindle member, a casing secured to the frame element and having top and bottom walls provided with vertically aligned apertures, one of said members extending through said apertures, a flange fixed to the last mentioned member intermediate said walls to prevent axial displacement of the member relative to said casing while permitting its relative rotation, the other of said members being fixedly connected with the running gear element whereby relative movements of said elements toward and away for each other cause similar movements of said members with consequent rotation of the rotatable member, indicating mechanism actuated in dependence upon the rotative movements of said rotatable member, and telescoping tubes surrounding said members and in fixed connection respectively with said elements, one of said tubes being directly fixed to said casing.

In testimony whereof I have hereunto set my hand.

THOMAS J. WALSH.